(12) United States Patent
Bains

(10) Patent No.: US 8,364,882 B2
(45) Date of Patent: Jan. 29, 2013

(54) SYSTEM AND METHOD FOR EXECUTING FULL AND PARTIAL WRITES TO DRAM IN A DIMM CONFIGURATION

(75) Inventor: Kuljit S. Bains, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 11/968,141

(22) Filed: Dec. 31, 2007

(65) Prior Publication Data

US 2009/0172271 A1  Jul. 2, 2009

(51) Int. Cl.
*G06F 12/00* (2006.01)

(52) U.S. Cl. ............... 711/5; 711/154; 711/167; 710/65

(58) Field of Classification Search .............. 711/5, 104, 711/154, 167; 365/187.17; 710/65–66
See application file for complete search history.

(56) References Cited

U.S. PATENT DOCUMENTS

| 5,661,695 A * | 8/1997 | Zagar et al. ............... 365/189.15 |
| 5,802,597 A * | 9/1998 | Nelsen ........................... 711/169 |
| 6,029,218 A * | 2/2000 | Oobuchi ....................... 710/110 |
| 2002/0029365 A1* | 3/2002 | Sato et al. ..................... 714/763 |
| 2003/0074517 A1* | 4/2003 | Nicolai ............................. 711/5 |
| 2004/0044850 A1* | 3/2004 | George et al. ................. 711/131 |

* cited by examiner

*Primary Examiner* — Matthew Bradley
(74) *Attorney, Agent, or Firm* — Grossman, Tucker, Perreault & Pfleger, PLLC

(57) ABSTRACT

In an embodiment of the invention, a host or other controller writing to multiple DRAMs in a DIMM configuration determines whether there is full write request to at least one of the multiple DRAM's and a partial write request to at least another one of the multiple DRAM's. If so, then the host parses data associated with the full write request into a first portion and a second portion. The host then outputs a first partial write command associated with the first portion and a second partial write command associated with the second portion to the DIMM. Other embodiments are described.

12 Claims, 6 Drawing Sheets

| | TRANSFERS | | | | | | | |
|---|---|---|---|---|---|---|---|---|
| | UI0 | UI1 | UI2 | UI3 | UI4 | UI5 | UI6 | UI7 |
| DQ0<br>DQ1<br>DQ2<br>DQ3<br>DQ4<br>DQ5<br>DQ6<br>DQ7 | BYTE 0 DATA | BYTE 1 DATA | BYTE 2 DATA | BYTE 3 DATA | BYTE 4 DATA | BYTE 5 DATA | BYTE 6 DATA | BYTE 7 DATA |

FIG. 2A

| | | TRANSFERS | | | | | | |
|---|---|---|---|---|---|---|---|---|
| | UI0 | UI1 | UI2 | UI3 | UI4 | UI5 | UI6 | UI7 |
| DQ0<br>DQ1<br>DQ2<br>DQ3<br>DQ4<br>DQ5<br>DQ6<br>DQ7 | DM0<br>DM1<br>DM2<br>DM3<br>DM4<br>DM5<br>DM6<br>DM7 | DATA | DATA | DATA | DATA | DATA | DATA | DATA |

FIG. 2B

| | | TRANSFERS | | | | | | |
|---|---|---|---|---|---|---|---|---|
| | UI0 | UI1 | UI2 | UI3 | UI4 | UI5 | UI6 | UI7 |
| DQ0<br>DQ1<br>DQ2<br>DQ3<br>DQ4<br>DQ5<br>DQ6<br>DQ7 | DM0=0<br>DM1=1<br>DM2=0<br>DM3=0<br>DM4=0<br>DM5=0<br>DM6=0<br>DM7=0 | BYTE 0 DATA | BYTE 2 DATA | BYTE 3 DATA | BYTE 4 DATA | BYTE 5 DATA | BYTE 6 DATA | BYTE 7 DATA |

FIG. 2C

| | | TRANSFERS | | | | | | |
|---|---|---|---|---|---|---|---|---|
| | UI0 | UI1 | UI2 | UI3 | UI4 | UI5 | UI6 | UI7 |
| DQ0<br>DQ1<br>DQ2<br>DQ3<br>DQ4<br>DQ5<br>DQ6<br>DQ7 | DM0=1<br>DM1=1<br>DM2=0<br>DM3=0<br>DM4=0<br>DM5=0<br>DM6=0<br>DM7=1 | BYTE 1<br>=0 | BYTE 2 DATA | BYTE 3 DATA | BYTE 4 DATA | BYTE 5 DATA | BYTE 6 DATA | BYTE 7<br>=0 |

FIG. 2D

| DRAM 0 | | TRANSFERS | | | | | | |
|---|---|---|---|---|---|---|---|---|
| | | UI0 | UI1 | UI2 | UI3 | UI4 | UI5 | UI6 | UI7 |
| DQ0 | DM0=0 | BYTE 0 DATA | BYTE 2 =0 | BYTE 3 =0 | BYTE 4 =0 | BYTE 5 =0 | BYTE 6 =0 | BYTE 7 =0 |
| DQ1 | DM1=1 | | | | | | | |
| DQ2 | DM2=1 | | | | | | | |
| DQ3 | DM3=1 | | | | | | | |
| DQ4 | DM4=1 | | | | | | | |
| DQ5 | DM5=1 | | | | | | | |
| DQ6 | DM6=1 | | | | | | | |
| DQ7 | DM7=1 | | | | | | | |

505

| DRAM 1 | | TRANSFERS | | | | | | |
|---|---|---|---|---|---|---|---|---|
| | | UI0 | UI1 | UI2 | UI3 | UI4 | UI5 | UI6 | UI7 |
| DQ0 | DM0=0 | | BYTE 0 DATA | BYTE 2 =0 | BYTE 3 =0 | BYTE 4 =0 | BYTE 5 =0 | BYTE 6 =0 | BYTE 7 =0 |
| DQ1 | DM1=1 | | | | | | | |
| DQ2 | DM2=1 | | | | | | | |
| DQ3 | DM3=1 | | | | | | | |
| DQ4 | DM4=1 | | | | | | | |
| DQ5 | DM5=1 | | | | | | | |
| DQ6 | DM6=1 | | | | | | | |
| DQ7 | DM7=1 | | | | | | | |

510

| DRAM 2 | | TRANSFERS | | | | | | |
|---|---|---|---|---|---|---|---|---|
| | | UI0 | UI1 | UI2 | UI3 | UI4 | UI5 | UI6 | UI7 |
| DQ0 | DM0=1 | | BYTE 1 =0 | BYTE 2 =0 | BYTE 3 =0 | BYTE 4 =0 | BYTE 5 =0 | BYTE 6 =0 | BYTE 7 =0 |
| DQ1 | DM1=1 | | | | | | | |
| DQ2 | DM2=1 | | | | | | | |
| DQ3 | DM3=1 | | | | | | | |
| DQ4 | DM4=1 | | | | | | | |
| DQ5 | DM5=1 | | | | | | | |
| DQ6 | DM6=1 | | | | | | | |
| DQ7 | DM7=1 | | | | | | | |

515

⋮

| DRAM 7 | | TRANSFERS | | | | | | |
|---|---|---|---|---|---|---|---|---|
| | | UI0 | UI1 | UI2 | UI3 | UI4 | UI5 | UI6 | UI7 |
| DQ0 | DM0=1 | | BYTE 1 =0 | BYTE 2 =0 | BYTE 3 =0 | BYTE 4 =0 | BYTE 5 =0 | BYTE 6 =0 | BYTE 7 =0 |
| DQ1 | DM1=1 | | | | | | | |
| DQ2 | DM2=1 | | | | | | | |
| DQ3 | DM3=1 | | | | | | | |
| DQ4 | DM4=1 | | | | | | | |
| DQ5 | DM5=1 | | | | | | | |
| DQ6 | DM6=1 | | | | | | | |
| DQ7 | DM7=1 | | | | | | | |

| DRAM 0 | | TRANSFERS | | | | | | |
|---|---|---|---|---|---|---|---|---|
| | | UI0 | UI1 | UI2 | UI3 | UI4 | UI5 | UI6 | UI7 |
| DQ0<br>DQ1<br>DQ2<br>DQ3<br>DQ4<br>DQ5<br>DQ6<br>DQ7 | DM0=0<br>DM1=0<br>DM2=0<br>DM3=0<br>DM4=0<br>DM5=0<br>DM6=0<br>DM7=1 | BYTE 0<br>DATA | BYTE 1<br>DATA | BYTE 2<br>DATA | BYTE 3<br>DATA | BYTE 4<br>DATA | BYTE 5<br>DATA | BYTE 6<br>DATA |

605

| DRAM 1 | | TRANSFERS | | | | | | |
|---|---|---|---|---|---|---|---|---|
| | | UI0 | UI1 | UI2 | UI3 | UI4 | UI5 | UI6 | UI7 |
| DQ0<br>DQ1<br>DQ2<br>DQ3<br>DQ4<br>DQ5<br>DQ6<br>DQ7 | DM0=0<br>DM1=1<br>DM2=1<br>DM3=1<br>DM4=1<br>DM5=1<br>DM6=1<br>DM7=1 | BYTE 0<br>DATA | BYTE 2<br>=0 | BYTE 3<br>=0 | BYTE 4<br>=0 | BYTE 5<br>=0 | BYTE 6<br>=0 | BYTE 7<br>=0 |

| DRAM 0 | | TRANSFERS | | | | | | |
|---|---|---|---|---|---|---|---|---|
| | | UI0 | UI1 | UI2 | UI3 | UI4 | UI5 | UI6 | UI7 |
| DQ0<br>DQ1<br>DQ2<br>DQ3<br>DQ4<br>DQ5<br>DQ6<br>DQ7 | DM0=1<br>DM1=1<br>DM2=1<br>DM3=1<br>DM4=1<br>DM5=1<br>DM6=1<br>DM7=0 | BYTE 1<br>=0 | BYTE 2<br>=0 | BYTE 3<br>=0 | BYTE 4<br>=0 | BYTE 5<br>=0 | BYTE 6<br>=0 | BYTE 7<br>DATA |

615

| DRAM 1 | | TRANSFERS | | | | | | |
|---|---|---|---|---|---|---|---|---|
| | | UI0 | UI1 | UI2 | UI3 | UI4 | UI5 | UI6 | UI7 |
| DQ0<br>DQ1<br>DQ2<br>DQ3<br>DQ4<br>DQ5<br>DQ6<br>DQ7 | DM0=1<br>DM1=1<br>DM2=1<br>DM3=1<br>DM4=1<br>DM5=1<br>DM6=1<br>DM7=1 | BYTE 1<br>=0 | BYTE 2<br>=0 | BYTE 3<br>=0 | BYTE 4<br>=0 | BYTE 5<br>=0 | BYTE 6<br>=0 | BYTE 7<br>=0 |

SYSTEM AND METHOD FOR EXECUTING FULL AND PARTIAL WRITES TO DRAM IN A DIMM CONFIGURATION

FIELD

The invention relates generally to electronic memory devices, and more particularly, but without limitation, to systems and methods for writing to Dynamic Random Access Memory (DRAM) in a Dual Inline Memory Module (DIMM) configuration.

BACKGROUND

In the interest of data transfer efficiencies, it is sometimes desirable to perform partial data writes from a host to a DRAM or other memory device. Conventional approaches require the addition of a data mask or other signal line between the host and the memory device, however, which is counterproductive to achieving high-density packaging. Moreover, known methods are not well-suited for writing data to DRAM devices in a DIMM configuration. Improved systems and methods are therefore needed for executing full and partial data writes to a DIMM.

BRIEF DESCRIPTION OF THE DRAWINGS

The present invention will be more fully understood from the detailed description below and the accompanying drawings, wherein:

FIGS. 2A-2D are illustrations of data frame formats for a DRAM device, according to embodiments of the invention;

FIG. 5 is an illustration of data frames associated with a partial write command, according to an embodiment of the invention; and FIGS. 6A and 6B are illustrations of data frames associated with two sequential partial write commands, according to an embodiment of the invention.

DETAILED DESCRIPTION

Embodiments of the invention will now be described more fully with reference to FIGS. 1A through 6B, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1A:
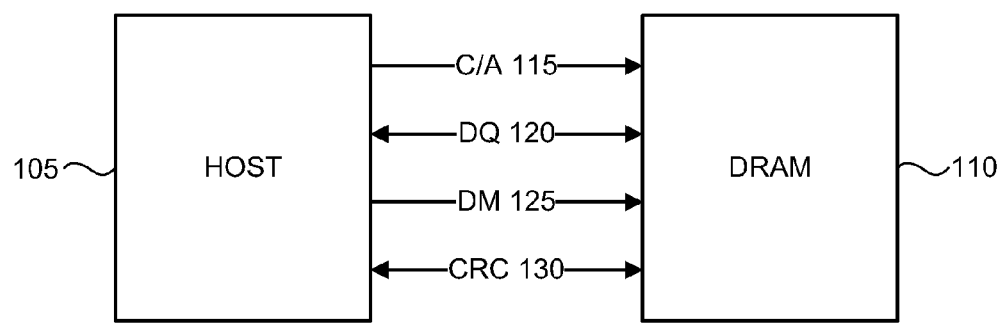
FIGS. 1A and 1B are block diagrams of a memory system, according to embodiments of the invention.
Figure 1B:
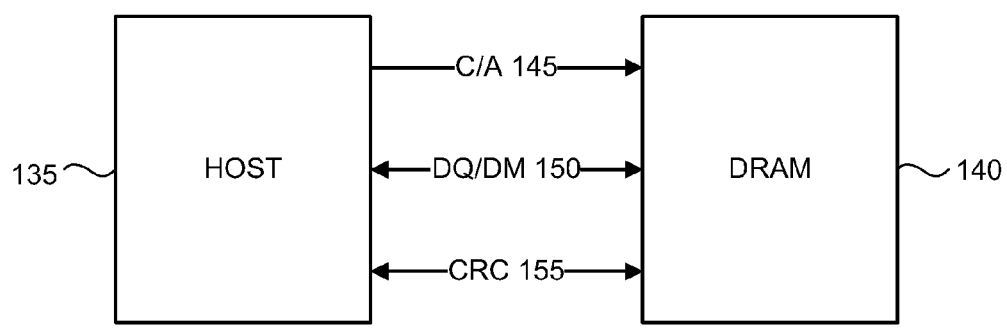

FIGS. 1A and 1B are block diagrams of a memory system, according to embodiments of the invention. As illustrated in FIG. 1A, a Host 105 is coupled to a Dynamic Random Access Memory (DRAM) device 110. A unidirectional Command Address (C/A) bus 115 is configured to transmit commands from the host 105 to the DRAM 110. A bidirectional read/write data bus (DQ) 120 is configured to transmit data between the host 105 and the DRAM 110. A uni-directional Data Mask (DM) bus 125 is configured to transmit DM instructions from the host 105 to the DRAM 110. A bi-directional Cyclic Redundancy Check (CRC) bus 130 is configured to communicate checksum data between the host 105 and the DRAM 110.

Variations to the architecture illustrated in FIG. 1A are possible. For example, a memory controller (not shown) could be coupled between the host 105 and the DRAM 110. In addition, the use of CRC bus 130 and associated CRC checksum data is optional, according to design choice. Moreover, one or both of DQ bus 120 and CRC bus 130 could be unidirectional instead of bidirectional, as dictated by application requirements.

FIG. 1B is a block diagram of a memory system, according to an embodiment of the invention. As shown therein, a host 135 is coupled to a DRAM 140. A uni-directional C/A bus 145 is configured to transmit commands from the host 135 to the DRAM 140. A bidirectional DQ/DM bus 150 is configured to transmit data between the host 135 and the DRAM 140. In addition, the DQ/DM bus 150 is also configured to transmit DM instructions from the host 135 to the DRAM 140. The CRC bus 155 is configured to communicate checksum data between the host 135 and the DRAM 140.

The host 135 may be configured to generate at least two different write commands: a full write (W) command and a partial write (Wm) command.

The DRAM 140 may be configured to store data differently depending upon whether the DRAM 140 receives the W command or the Wm command from the host 135. More specifically, the DRAM 140 may process all bits in each transfer of data received on the DQ/DM bus 150 as data in the case of a W command, and the DRAM 140 may treat all bits in a first Unit Interval (UI) transfer of data received on the DQ/DM bus 150 as DM instructions in the case of a Wm command.

Variations to the architecture illustrated in FIG. 1B are possible. For example, a memory controller (not shown) could be coupled between the host 135 and the DRAM 140. In addition, the use of CRC bus 155 and associated CRC checksum data is optional, according to design choice. Moreover, one or both of DQ/DM bus 150 and CRC bus 155 could be unidirectional instead of bidirectional, as dictated by application requirements.

FIGS. 2A-2D are illustrations of data frame formats for a DRAM device, according to embodiments of the invention. FIG. 2A illustrates a full write data frame format. The DRAM has an 8-bit wide data bus and receives 8 sequential UI transfers of data (i.e., UI0 through UI7). The DRAM receives one 8-bit byte in each UI transfer.

FIG. 2B illustrates a partial write data frame format. As illustrated in FIG. 2B, a partial write format may use the first UI transfer (UI0) to transmit 8 data mask information bits to the DRAM device. Data may then be transmitted sequentially during transfers UI1 through UI7.

A DRAM may be configured to use two rules in processing DM information associated with a partial write (Wm) command. A first rule is: if Data Mask bit (DMn) is equal to 1, then byte n is skipped, and all subsequent bytes are assigned to the data frame. A second rule is: if more than one data mask bit is equal to 1, then the lowest order masked byte is skipped, the remaining 7 bytes are assigned to UI transfers in sequential order, and data bits in subsequent masked bytes (i.e., other than the lowest order masked byte) are zeroed.

FIG. 2C illustrates a partial write data frame example. As shown therein, data mask bit 1 (DM1) is equal to 1. Accordingly, byte 0 data is transmitted during transfer UI1, byte 1 data is skipped, and data associated with bytes 2 through 7 are transmitted during transfers UI2 through UI7. FIG. 2C thus illustrates the first rule.

FIG. 2D illustrates another partial write data frame example. As shown therein, data mask bits 0, 1, and 7 (DM0, DM1, and DM7) are equal to 1. Accordingly, byte 0 (the lowest order masked byte) is skipped, bytes 1 through 7 are assigned to UI transfers UI1 through UI7, and data associated with bytes 1 and 7 are zeroed. FIG. 2C thus illustrates the second rule.

Figure 3:
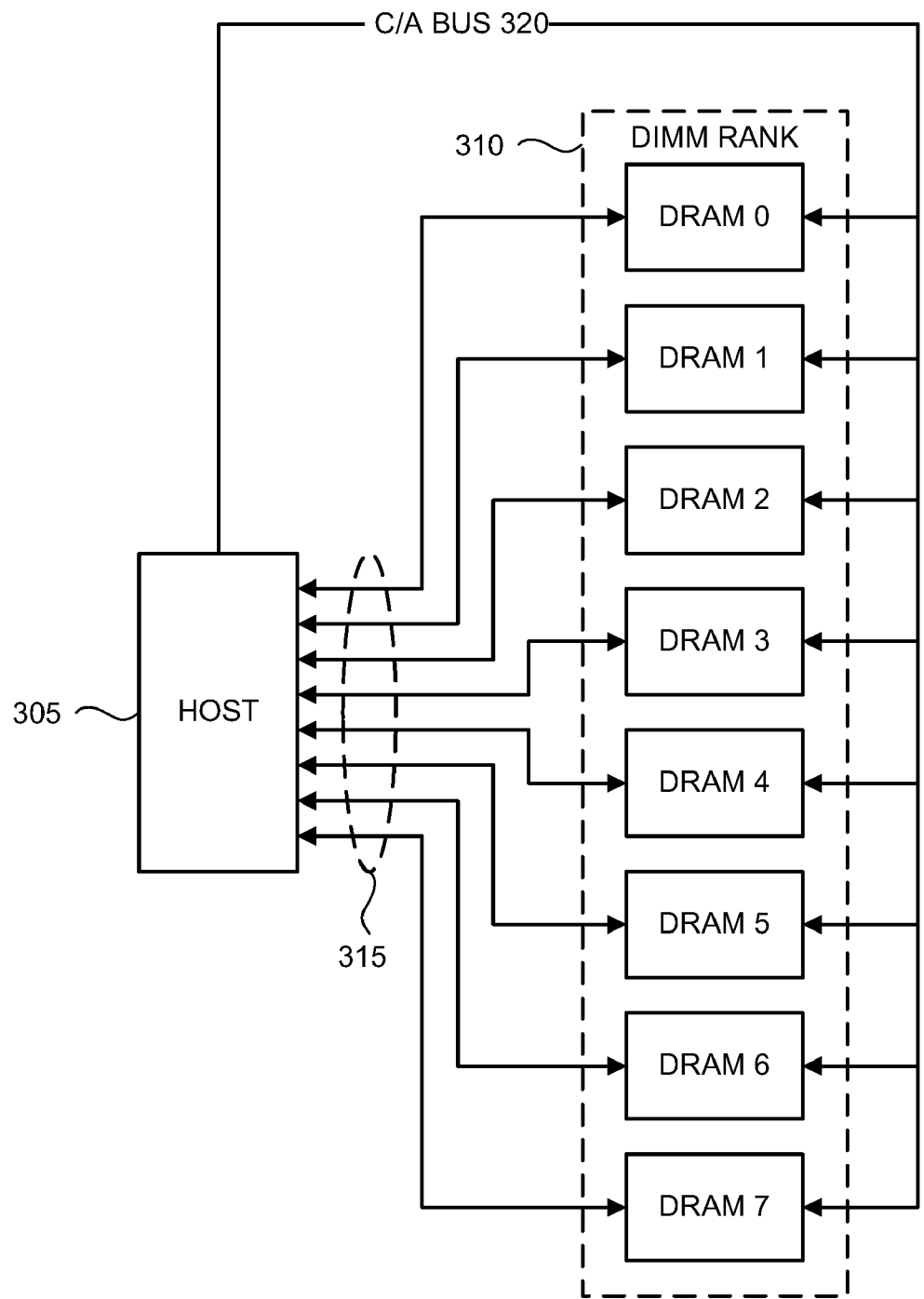
FIG. 3 is a block diagram of a memory system having a DIMM configuration, according to an embodiment of the invention.

FIG. 3 is a block diagram of a memory system having a DIMM configuration, according to an embodiment of the invention. As illustrated in FIG. 3, a host 305 is coupled to a DIMM RANK 310. DIMM RANK 310 includes DRAM 0 through DRAM 7. The DIMM RANK 310 represents a set of DRAM's that can be accessed simultaneously for the full width of the data bus 315. Here, eight DRAM's in the DIMM RANK 310 can be accessed simultaneously on the 64-bit data bus 315.

As also illustrated in FIG. 3, a C/A bus 320 couples the host 305 to the DIMM RANK 310. In the illustrated embodiment, the C/A bus 320 is daisy-chained to each of the DRAM's (DRAM 0 through DRAM 7) in the DIMM RANK 310. Accordingly, all DRAM's included in the DIMM RANK 310 receive the same command from the host 305.

A consequence of the architecture illustrated in FIG. 3 and described above is that if one of the DRAM's (DRAM 0 through DRAM 7) receives a partial write command, then all DRAM's (DRAM 0 through DRAM 7) receive the partial write command. Accommodations must therefore be made when the host 305 receives a request (for example, from an application program) that requires a full write to one DRAM in the DIMM rank 310 and a partial write to another DRAM in the DIMM rank 310.

Figure 4:
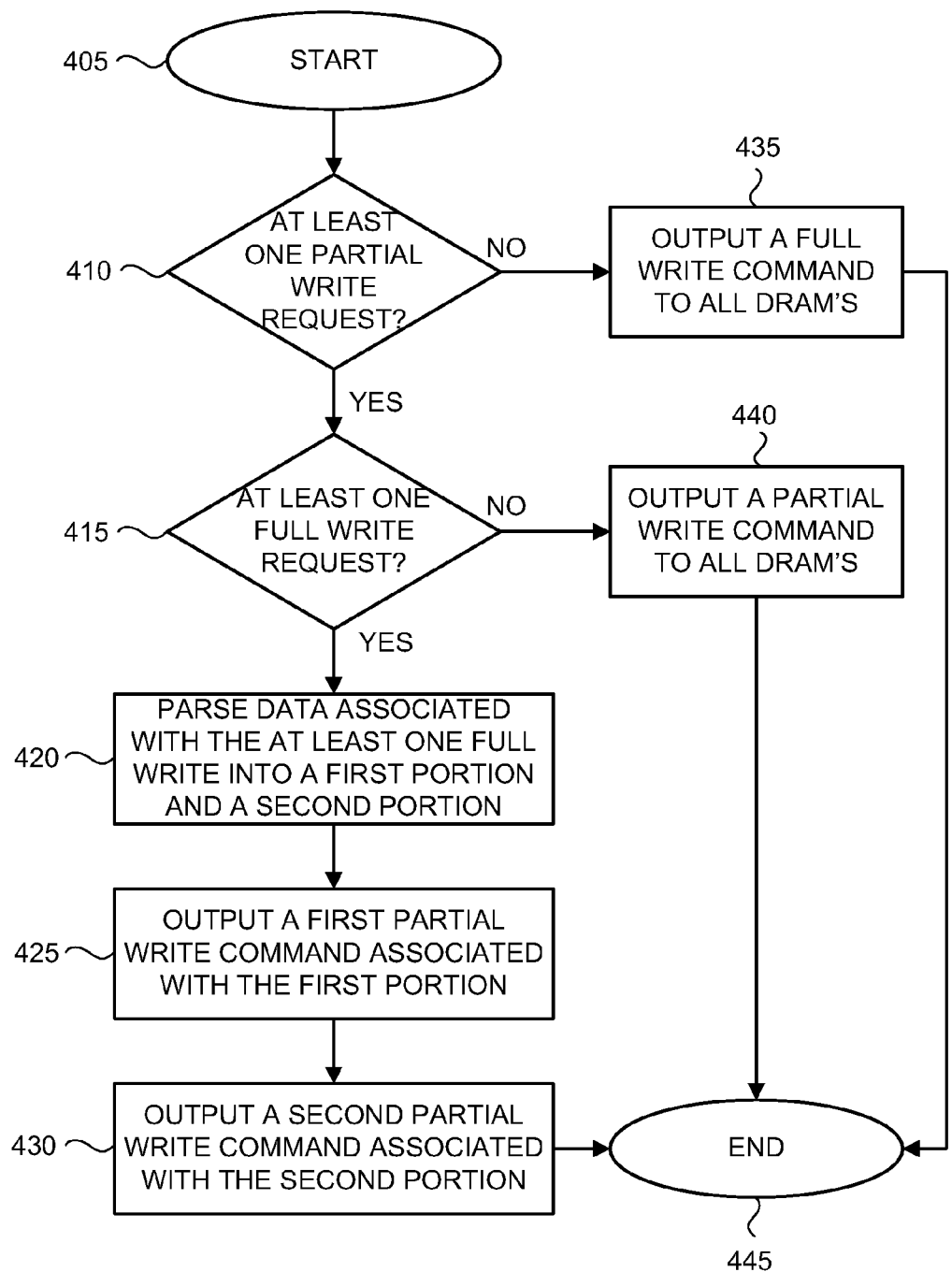
FIG. 4 is a flow diagram of a process for writing to memory in a DIMM configuration, according to an embodiment of the invention.

FIG. 4 is a flow diagram of a process for writing to memory in a DIMM configuration, according to an embodiment of the invention. The process illustrated in FIG. 4 may be executed, for example, by the host 305 or by a memory controller (not shown) that is coupled between the host 305 and the DIMM rank 310.

After beginning in step 405, the process determines in conditional step 410 whether there exists at least one partial write request. Where conditional step 410 is satisfied, the process advances to conditional step 415 to determine whether there is at least one full write request. Where conditional step 415 is satisfied, the process parses data associated with the at least one full write request into a first portion and a second portion. Then, the process outputs a first partial write command associated with the first portion in step 425 and further outputs a second partial write command associated with the second portion in step 430 before terminating in step 445.

Where the result of conditional step 410 indicates that there are no partial write requests, the process outputs a full write command to all DRAM's in step 435 before terminating in step 445.

Where the process determines in conditional step 415 that there are no full writes requests, the process outputs a partial write command to all DRAM's in step 440 before terminating in step 445.

Thus, according to the process illustrated in FIG. 4, the host 305 always transmits either a full write (W) command or a partial write (Wm) command to all DRAM's in a rank. Where the host 305 receives a request (for example, from an application) for a partial write to one DRAM and a full write to at least one other DRAM in the DIMM rank 310, then the host parses the data associated with the full write request and transmits two sequential partial write (Wm) commands to the DIMM rank 310.

Variations to the process illustrated in FIG. 4 are possible. For example, in an alternative embodiment, step 415 could be executed prior to step 410.

FIG. 5 is an illustration of data frames associated with a single partial write command, according to an embodiment of the invention. In particular, FIG. 5 illustrates data frame 505 associated with DRAM 0, data frame 510 associated with DRAM 1, data frame 515 associated with DRAM 2, and data frame 520 associated with DRAM 7. Each of the data frames 505, 510, 515, and 520 represent data frames in response to a partial write (Wm) command transmitted from the host 305 to the DIMM rank 310. In the illustrated example, word writes are performed to DRAM 0 and DRAM 1 during the UI1 transfer, as shown by data frames 505 and 510. All other data is masked with respect to DRAM 0 and DRAM 1. In addition, no data is written to DRAM's 2 and 7, as indicated by data frames 515 and 520, respectively.

FIG. 5 thus illustrates the result of a single partial write (Wm) command to a DIMM rank. The example in FIG. 5 is in accord with step 440 of FIG. 4.

FIGS. 6A and 6B are illustrations of data frames associated with two sequential partial write commands, according to an embodiment of the invention. In particular, FIGS. 6A and 6B illustrate the case where a host 305 receives a request (for example from an application program) for a full write to DRAM 0 and a partial write to DRAM 1. The data frames illustrated in FIG. 6A are in accord with step 425 of FIG. 4, and the data frames in FIG. 6B are in accord with step 430 of FIG. 4.

In executing a first partial write command, data frame 605 illustrates that bytes 0 through 6 are written to DRAM 0 during transfers UI1 through UI7. Additionally, byte 0 data is written to DRAM 1 during transfer UI, as illustrated in data frame 610.

FIG. 6B illustrates that, during execution of a second partial write command, byte 7 data is written to DRAM 0 during transfer UI7, as indicated by data frame 615. Since there is no additional data to write to DRAM 1, all bytes are masked and no data is written to DRAM 1 during execution of the second partial write command, as shown by data frame 620.

The process illustrated in FIG. 4 and further described with reference to other figures of this specification may be embodied in code that is stored in a processor-readable storage medium, and may be executed by the host 135, a memory controller, or other processor that is configured to read and execute code that is stored in the processor-readable storage medium. Moreover, the process illustrated in FIG. 4 may be implemented in hardware, software, or a combination of hardware, according to design choice.

It will be apparent to those skilled in the art that modifications and variations can be made without deviating from the spirit or scope of the invention. For example, alternative data bus and DIMM rank sizes may be used, according to design choice. Thus, it is intended that the present invention cover any such modifications and variations of this invention provided they come within the scope of the appended claims and their equivalents.

The invention claimed is:

1. A method for writing to a Dual Inline Memory Module (DIMM), the DIMM having a plurality of Dynamic Random Access Memory (DRAM) devices, the method comprising:
   determining whether there is at least one partial write request associated with a first DRAM device of the plurality of DRAM devices;
   if there is at least one partial write request associated with the first DRAM device, determining, in response to the at least one partial write request, whether there is at least one full write request associated with a second DRAM device of the plurality of DRAM devices, wherein the second DRAM device is different from the first DRAM device;

if there is at least one partial write request associated with the first DRAM device and there is at least one full write request associated with the second DRAM device, parsing data associated with the at least one full write request associated with the second DRAM device into a first portion and a second portion;

outputting a first partial write command to the DIMM, the first partial write command associated with the first portion; and outputting a second partial write command to the DIMM, the second partial write command associated with the second portion.

2. The method of claim 1, further comprising, if there is not at least one partial write request, outputting a full write command to the plurality of DRAM devices.

3. The method of claim 1, further comprising, if there is not at least one full write request, outputting a partial write command to the plurality of DRAM devices.

4. The method of claim 1, wherein the first portion is associated with "i" bytes of data and the second portion is associated with "n-i" bytes of data, "n" being a byte length of a data transfer.

5. A processor-readable non-transitory storage medium having code stored thereon, the code configured to implement a method for writing to a Dual Inline Memory Module (DIMM), the DIMM having a plurality of Dynamic Random Access Memory (DRAM) devices, the method comprising:

determining whether there is at least one partial write request associated with a first DRAM device of the plurality of DRAM devices;

if there is at least one partial write request associated with the first DRAM device, determining, in response to the at least one partial write request, whether there is at least one full write request associated with a second DRAM device of the plurality of DRAM devices, wherein the second DRAM device is different from the first DRAM device;

if there is at least one partial write request associated with the first DRAM device and there is at least one full write request associated with the second DRAM device, parsing data associated with the at least one full write request associated with the second DRAM device into a first portion and a second portion;

outputting a first partial write command to the DIMM, the first partial write command associated with the first portion; and outputting a second partial write command to the DIMM, the second partial write command associated with the second portion 6. The processor-readable non-transitory medium of claim 5, the method further comprising: if there is not at least one partial write request, outputting a full write command to the plurality of DRAM devices.

7. The processor-readable non-transitory medium of claim 5, the method further comprising: if there is not at least one full write request, outputting a partial write command to the plurality of DRAM devices.

8. The processor-readable non-transitory medium of claim 5, wherein the first portion is associated with "i" bytes of data and the second portion is associated with "n -i" bytes of data, "n" being a byte length of a data transfer.

9. A memory system comprising:

a host; and a Dual Inline Memory Module (DIMM) coupled to the host, the DIMM having a plurality of DRAM devices, the host configured to perform a method, the method including:

determining whether there is at least one partial write request associated with a first DRAM device of the plurality of DRAM devices;

if there is at least one partial write request associated with the first DRAM device, determining, in response to the at least one partial write request, whether there is at least one full write request associated with a second DRAM device of the plurality of DRAM devices, wherein the second DRAM device is different from the first DRAM device;

if there is at least one partial write request associated with the first DRAM device and there is at least one full write request associated with the second DRAM device, parsing data associated with the at least one full write request associated with the second DRAM device into a first portion and a second portion;

outputting a first partial write command to the DIMM, the first partial write command associated with the first portion; and outputting a second partial write command to the DIMM, the second partial write command associated with the second portion 10. The memory system of claim 9, the method further including: if there is not at least one partial write request, outputting a full write command to the plurality of DRAM devices.

11. The memory system of claim 9, the method further including: if there is not at least one full write request, outputting a partial write command to the plurality of DRAM devices.

12. The memory system of claim 9, wherein the first portion is associated with "i" bytes of data and the second portion is associated with "n-i" bytes of data, "n" being a byte length of a data transfer.

* * * * *